(12) United States Patent
Tang et al.

(10) Patent No.: US 12,011,650 B2
(45) Date of Patent: Jun. 18, 2024

(54) WEARABLE DEVICE, CONTROL METHOD AND APPARATUS THEREOF, AND COMPUTER STORAGE MEDIUM

(71) Applicant: Guangdong COROS Sports Technology Joint Stock Company, Guangdong (CN)

(72) Inventors: Yu Tang, Guangdong (CN); Cheng Chen, Guangdong (CN); Xi Yang, Guangdong (CN)

(73) Assignee: GUANGDONG COROS SPORTS TECHNOLOGY JOINT STOCK COMPANY, Dongguan (CN)

( * ) Notice: Subject to any disclaimer, the term of this patent is extended or adjusted under 35 U.S.C. 154(b) by 273 days.

(21) Appl. No.: 17/576,145

(22) Filed: Jan. 14, 2022

(65) Prior Publication Data
US 2022/0219063 A1    Jul. 14, 2022

(30) Foreign Application Priority Data
Jan. 14, 2021  (CN) .......................... 202110047017.2

(51) Int. Cl.
*A63B 71/06*      (2006.01)
*G01C 21/00*      (2006.01)
(Continued)

(52) U.S. Cl.
CPC ........ *A63B 71/0616* (2013.01); *G01C 21/005* (2013.01); *G01C 21/20* (2013.01); *G01S 19/19* (2013.01)

(58) Field of Classification Search
CPC .... A63B 71/06; A63B 71/0616; G01C 21/20; G01C 21/005; G01S 19/19
See application file for complete search history.

(56) References Cited

U.S. PATENT DOCUMENTS

| 2003/0087220 A1* | 5/2003 | Bessette | A63B 69/0028 434/247 |
| 2007/0300157 A1* | 12/2007 | Clausi | G06F 3/04883 715/703 |

(Continued)

FOREIGN PATENT DOCUMENTS

CN    109731315 A    5/2019

OTHER PUBLICATIONS

Office Action issued in Chinese Application No. 202110047017.2, dated Sep. 2, 2022.

*Primary Examiner* — Steve Rowland
(74) *Attorney, Agent, or Firm* — Michael Best & Friedrich LLP

(57) ABSTRACT

Provided are a wearable device, a control method and apparatus thereof, and a computer storage medium. The method includes providing route data of a competition route, where the route data of the competition route includes check-in point data; acquiring position data of the wearable device; determining, based on the position data of the wearable device and the route data of the competition route, a feature position located in the competition route and corresponding feature position data; calculating relative position data between the position data of the wearable device and the feature position data; and outputting corresponding prompt information on the wearable device according to the relative position data.

20 Claims, 10 Drawing Sheets

(51) Int. Cl.
*G01C 21/20* (2006.01)
*G01S 19/19* (2010.01)

(56) References Cited

U.S. PATENT DOCUMENTS

| | | | |
|---|---|---|---|
| 2010/0160014 A1* | 6/2010 | Galasso | A63F 9/143 463/6 |
| 2010/0184563 A1* | 7/2010 | Molyneux | A43B 5/00 473/570 |
| 2012/0105225 A1* | 5/2012 | Valtonen | G01S 19/47 340/539.13 |
| 2012/0116550 A1* | 5/2012 | Hoffman | A61B 5/6898 700/91 |
| 2013/0231760 A1* | 9/2013 | Rosen | A63F 13/816 700/91 |
| 2014/0222177 A1* | 8/2014 | Thurman | A63B 41/02 700/92 |
| 2015/0131845 A1* | 5/2015 | Forouhar | G06V 20/42 382/100 |
| 2016/0250519 A1* | 9/2016 | Watterson | A63B 24/0084 482/4 |
| 2017/0115126 A1* | 4/2017 | McMaster | H04W 68/005 |
| 2017/0216677 A1* | 8/2017 | Tchao | A63B 24/0084 |
| 2018/0268670 A1* | 9/2018 | Gabbay | G09B 21/003 |
| 2020/0239023 A1* | 7/2020 | Srinivasan | G05D 1/0276 |

* cited by examiner

WEARABLE DEVICE, CONTROL METHOD AND APPARATUS THEREOF, AND COMPUTER STORAGE MEDIUM

CROSS-REFERENCE TO RELATED APPLICATION(S)

This application claims priority to Chinese Patent Application No. 202110047017.2 filed Jan. 14, 2021, the disclosure of which is incorporated herein by reference in its entirety.

TECHNICAL FIELD

The present disclosure relates to the field of device control and, in particular, to a wearable device, a control method and apparatus thereof, and a computer storage medium.

BACKGROUND

In competitions such as cross-country running, hiking and mountaineering, athletes need to strictly follow the route specified by the competition committee to complete the competition. To prevent the athletes from cheating, such as cutting across the route and the like, the competition committee sets check-in points along the route, and the athletes need to clock in and sign in at each specified check-in point. After the competition, the competition committee will count and confirm the clock-in record of an athlete before announcing the result of the athlete to be valid.

To reflect athletic and challenge spirits, the competitions such as the cross-country running, hiking and mountaineering usually choose an outdoor non-artificial environment as the competition place. Since the distance is long (usually more than 100 km) and the environment is complicate (such as in forests, gravel trails, swamps, etc.), sufficient road signs cannot be set along the competition route and even no artificial assistance is provided in the check-in points. This has resulted in many athletes missing the check-in points and their scores being cancelled, losing time for finding the check-in points back and forth and even being exposed in a dangerous environment because of running in the wrong way.

SUMMARY

An object of the present disclosure is to provide a control method of a wearable device to solve the problems proposed in the above background.

To achieve the preceding object, the present disclosure provides solutions described below. A control method of a wearable device includes the steps described below.

Route data of a competition route is provided. The route data of the competition route includes check-in point data.

Position data of the wearable device is acquired.

A feature position located in the competition route and corresponding feature position data are determined based on the position data of the wearable device and the route data of the competition route.

Relative position data between the position data of the wearable device and the feature position data is calculated.

Corresponding prompt information is output on the wearable device according to the relative position data.

In an implementation, the feature position data and the position data of the wearable device each include at least one of corresponding longitude data, latitude data or altitude data; and correspondingly, the relative position data includes at least one of relative longitude data, relative latitude data or relative altitude data.

In an implementation, the feature position includes at least one of a start point position, an end point position or a check-in point.

In an implementation, the competition route is positioned by multiple route points. The route points include the start point position, the end point position, and the check-in point.

In an implementation, in response to determining that the feature position is the check-in point or the end point position, the method includes the steps described below.

Relative altitude data between the position data of the wearable device and the check-in point or relative altitude data between the position data of the wearable device and the end point position is calculated.

Relative altitude data moving from a current position of the wearable device to the check-in point or relative altitude data moving from a current position of the wearable device to the end point position is output on the wearable device.

In an implementation, the relative altitude data includes remaining climb data, and the step in which the relative altitude data between the position data of the wearable device and the check-in point or the relative altitude data between the position data of the wearable device and the end point position is calculated includes the steps described below.

Route points between the position data of the wearable device and a next check-in point are determined to be a first route point set, or route points between the position data of the wearable device and the end point position are determined to be a second route point set.

The remaining climb data is calculated according to the first route point set or the second route point set.

In an implementation, the step in which the remaining climb data is calculated according to the first route point set or the second route point set includes a step described below.

Altitude ascent values between all adjacent route points whose altitude ascend in the first route point set or altitude ascent values between all adjacent route points whose altitude ascend in the second route point set are superimposed successively to obtain the remaining climb data.

In an implementation, in response to determining that the feature position is the check-in point or the end point position, the method includes the steps described below.

Relative position data between the position data of the wearable device and the check-in point or relative position data between the position data of the wearable device and the end point position is calculated.

The step in which the corresponding prompt information is output on the wearable device according to the relative position data includes a step described below.

Whether the relative position data between the position data of the wearable device and the check-in point or the relative position data between the position data of the wearable device and the end point position is within a first difference threshold is determined, in response to determining that the relative position data between the position data of the wearable device and the check-in point or the relative position data between the position data of the wearable device and the end point position is within the first difference threshold, prompt information of reaching the check-in point or prompt information of reaching the end point position is output on the wearable device.

In an implementation, the step in which the feature position located in the competition route and the corresponding feature position data are determined based on the position data of the wearable device and the route data of the competition route includes the steps described below.

After searching on the competition route, a route point having a closest distance from a position of a projection of the wearable device is determined to be a third route point, where the third route point is searched on the competition route according to at least one of the longitude data or the latitude data of the wearable device; or after searching on the competition route, a route point having a closest spatial distance from a position of a projection of the wearable device is determined to be a fourth route point, where the fourth route point is searched on the competition route according to at least one of the longitude data, the latitude data or the altitude data of the wearable device.

The feature position located in the competition route is determined according to the third route point or the fourth route point to obtain the feature position data.

In an implementation, before the step in which the feature position located in the competition route is determined according to the third route point or the fourth route point to obtain the feature position data, the method further includes a step described below.

Whether a relative position difference between the position data of the wearable device and the third route point or a relative position difference between the position data of the wearable device and the fourth route point exceeds a second difference threshold is determined, in response to determining that the relative position difference between the position data of the wearable device and the third route point or the relative position difference between the position data of the wearable device and the fourth route point exceeds the second difference threshold, prompt information of route deviation is output on the wearable device.

In an implementation, the method further includes the steps described below.

A deviation distance from the position data of the wearable device to the feature position data is calculated.

The corresponding prompt information is output on the wearable device according to the deviation distance.

In an implementation, the step in which the corresponding prompt information is output on the wearable device includes the following steps: corresponding prompt voice information is output on the wearable device and/or corresponding prompt graphic and text information is displayed on a display screen of the wearable device.

In an implementation, the route data includes at least one of longitude data, latitude data or altitude data and the method further includes the steps described below.

A feature position notation is performed on the competition route. The feature position notation includes at least longitude information, latitude information and feature position name information.

In another aspect, an embodiment of the present disclosure provides a control apparatus of a wearable device. The apparatus includes a route providing module, a position acquisition module, a feature determination module, a relative position calculation module and a prompt module.

The route providing module is configured to provide route data of a competition route. The route data of the competition route includes check-in point data.

The position acquisition module is configured to acquire position data of the wearable device.

The feature determination module is configured to determine a feature position located in the competition route and corresponding feature position data based on the position data of the wearable device and the route data of the competition route.

The relative position calculation module is configured to calculate relative position data between the position data of the wearable device and the feature position data.

The prompt module is configured to output corresponding prompt information on the wearable device according to the relative position data.

In another aspect, an embodiment of the present disclosure provides a wearable device, including a processor, which is configured to provide route data of a competition route, where the route data of the competition route includes check-in point data; acquire position data of the wearable device; determine, based on the position data of the wearable device and the route data of the competition route, a feature position located in the competition route and corresponding feature position data; calculate relative position data between the position data of the wearable device and the feature position data; and output corresponding prompt information on the wearable device according to the relative position data.

In another aspect, an embodiment of the present disclosure provides a non-transitory computer-readable storage medium configured to store computer programs, where the computer programs, when executed by a processor, implement the steps in any method described above.

In the wearable device, the control method and apparatus thereof, and the computer storage medium provided by the present disclosure, the athlete user can view the route in the wearable device before the competition, know the check-in point position of each competition segment, the total horizontal distance, the total ascend distance, the total descend distance of the competition track and the like, and also determine the feature position of the competition route for which the relative position data needs to be calculated, and calculate the relative position data on the wearable device according to the current position data and feature position data of the device, so that the athlete can determine the position on the competition route according to information related to the relative position, thereby assisting to solve problems that the athlete runs in the wrong way and the check-in points cannot be inaccurately guided during the competition.

DETAILED DESCRIPTION

Figure 1:
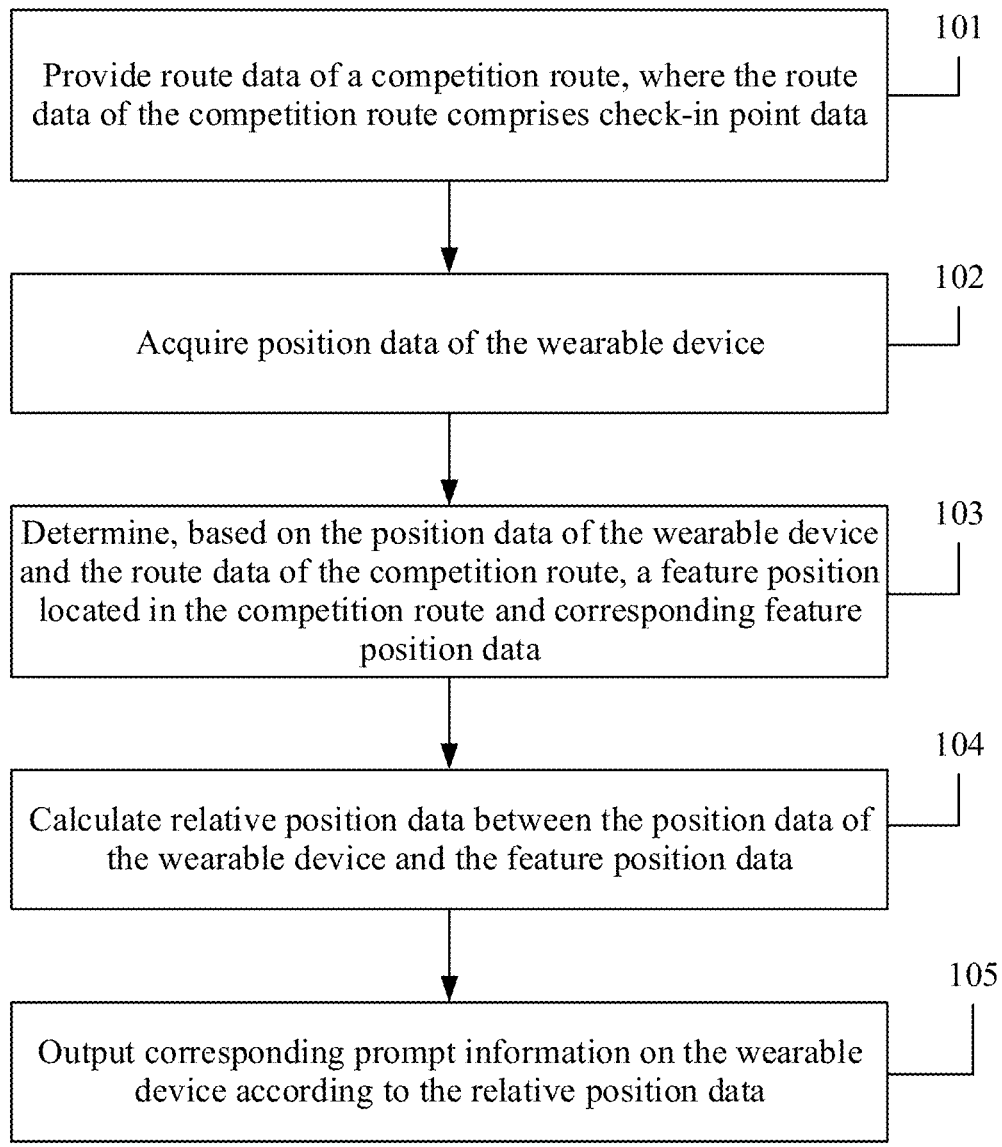
FIG. 1 is a flow diagram of a control method of a wearable device according to an embodiment of the present disclosure.

The technical schemes in embodiments of the present disclosure will be described clearly and completely in connection with the drawings in the embodiments of the present invention. Apparently, the embodiments described are part, not all, of the embodiments of the present disclosure. Based on the embodiments of the present disclosure, all other embodiments obtained by those of ordinary skill in the art without creative work are within the scope of the present disclosure.

In the description of the present disclosure, it is to be understood that the orientation or position relationships indicated by terms "center", "longitudinal", "lateral", "length", "width", "thickness", "above", "below", "front", "back", "left", "right", "vertical", "horizontal", "top", "bottom", "inside", "outside", "clockwise", "counterclockwise", etc. are based on the orientation or position relationships shown in the drawings, merely for facilitating description of the present disclosure and simplifying description, and do not indicate or imply that the apparatus or element referred to has a specific orientation and is constructed and operated in a specific orientation, and thus it is not to be construed as limiting the present disclosure. Moreover, terms like "first" and "second" are merely for description and are not to be construed as indicating or implying relative importance or implicitly indicating the number of technical features as indicated. Thus, a feature defined as a "first" feature or a "second" feature may explicitly or implicitly include one or more of such features. As used herein, the term "plurality" is defined as two or more, unless otherwise expressly specified and limited.

In the description of the present disclosure, it should be noted that unless otherwise expressly specified and limited, terms like "mounted", "connected to each other", "connected" are to be construed in a broad sense, for example, as permanently connected, detachably connected or integrally connected; mechanically connected or electrically connected; directly connected or indirectly connected via an intermediate medium; or internally communicated of the two elements or the interaction between the two elements. For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact or be in contact via another feature between the first feature and the second feature. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

The disclosure described below provides many different implementations or examples for implementing different structures of the present disclosure. To simplify the disclosure of the present disclosure, components and configurations of particular examples will be described below, which are, of course, illustrative only and are not intended to limit the present disclosure. Moreover, the present disclosure may repeat reference numbers and/or reference letters in different examples. Such repetition is for the purpose of simplification and clarity, and does not per se indicate a relationship between the discussed various implementations and/or configurations. In addition, the present disclosure provides examples of various specific processes and materials, but those of ordinary skill in the art can conceive the application of other processes and/or the use of other materials.

Referring to FIG. 1, an embodiment of the present disclosure provides a control method of a wearable device. The method includes the steps described below.

In step 101, route data of a competition route is provided. The route data of the competition route includes check-in point data.

In step 102, position data of the wearable device is acquired.

In step 103, a feature position located in the competition route and corresponding feature position data are determined based on the position data of the wearable device and the route data of the competition route.

In step 104, relative position data between the position data of the wearable device and the feature position data is calculated.

In step 105, corresponding prompt information is output on the wearable device according to the relative position data.

In the embodiment of the present disclosure, the wearable device may be any device capable of providing navigation and prompt functions such as a mobile phone, a wearable device (such as a sports watch, a smart watch, smart glasses, and a smart bracelet). The route data of the competition route and data information related to the check-in point may be acquired through an external device or a data platform, or graphic navigation data may be acquired first through a global positioning system (GPS), an altimeter, geomagnetic (compass) data or the like to obtain whole-course route data, an altitude curve and current position data of the athlete equipped with the wearable device, where the athlete is waiting for a detection device or a person.

Figure 2:
FIG. 2 is an overview information diagram of a graphical user interface of a wearable device according to an embodiment of the present disclosure.
Figure 3:
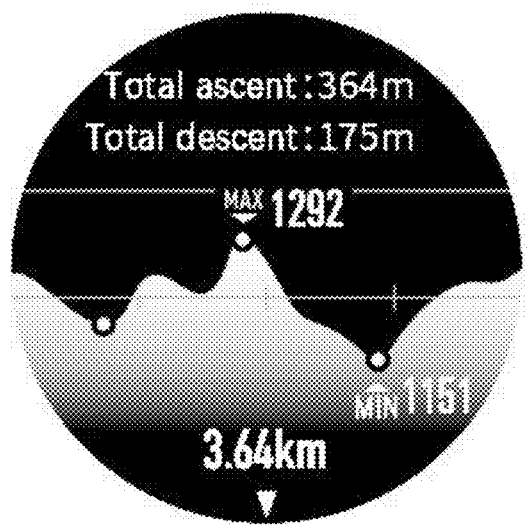
FIG. 3 is another overview information diagram of a graphical user interface of a wearable device according to an embodiment of the present disclosure.
Figure 4:
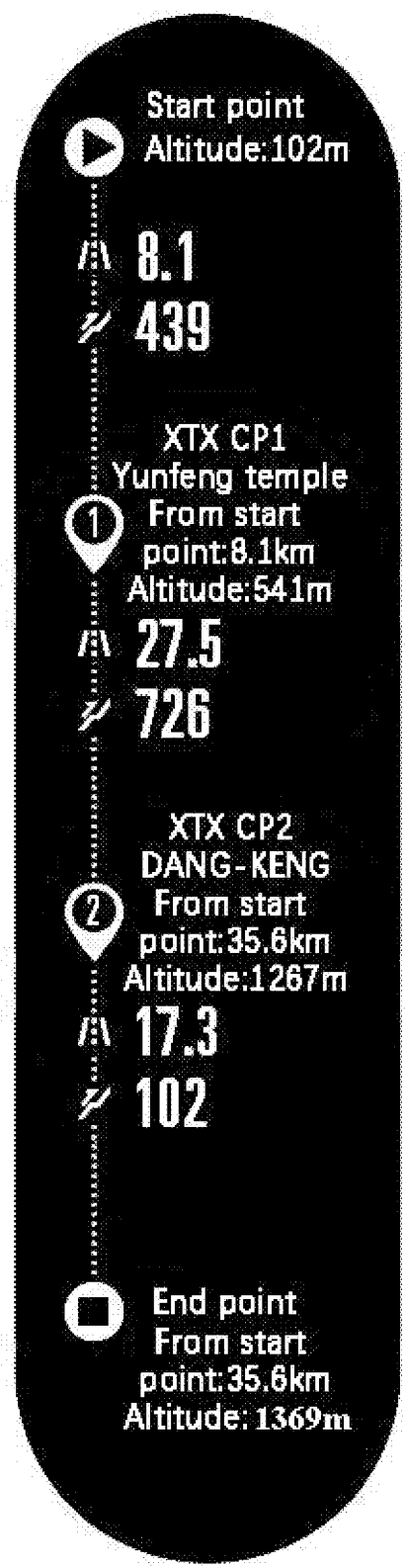
FIG. 4 is a segment annotation diagram of a graphical user interface of a wearable device according to an embodiment of the present disclosure.
Figure 5:
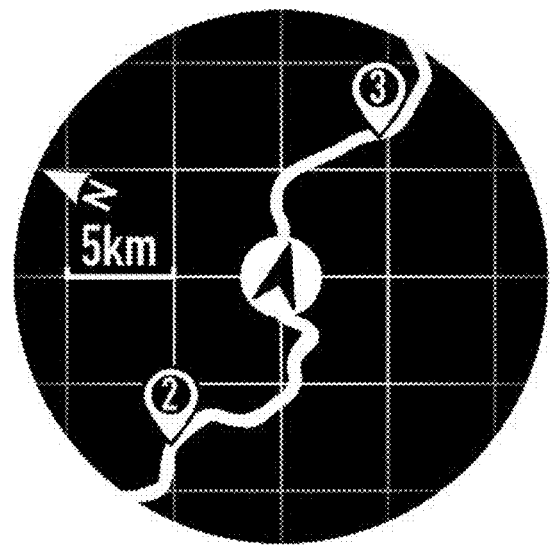
FIG. 5 is a route browsing diagram of a graphical user interface of a wearable device according to an embodiment of the present disclosure.
Figure 6:
FIG. 6 is another route browsing diagram of a graphical user interface of a wearable device according to an embodiment of the present disclosure.
Figure 7:
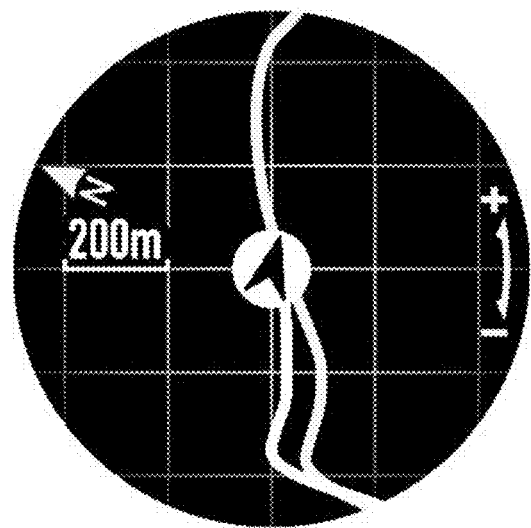
FIG. 7 is an interface enlarged diagram of a graphical user interface of a wearable device according to an embodiment of the present disclosure.
Figure 8:
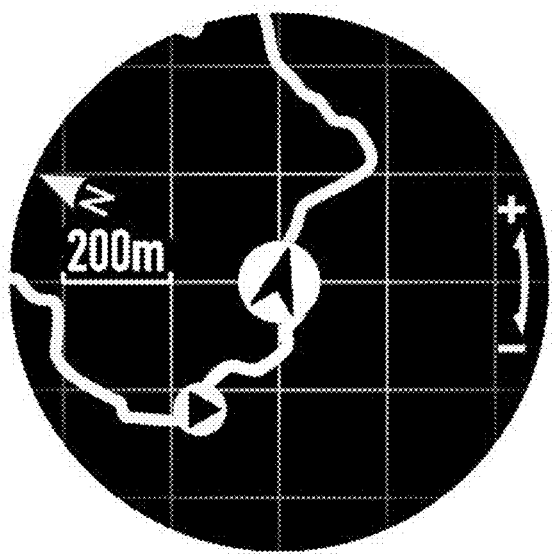
FIG. 8 is a down-scaled diagram of a graphical user interface of a wearable device according to an embodiment of the present disclosure.
Figure 9:
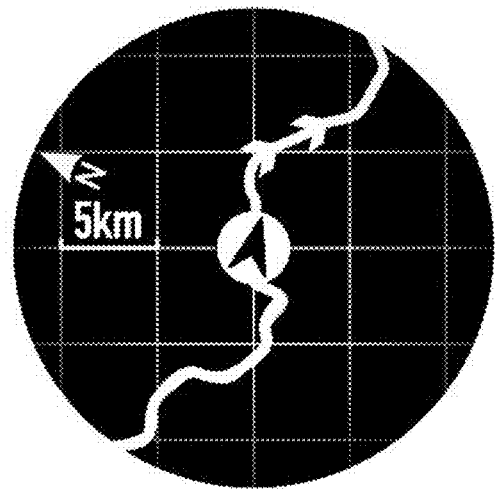
FIG. 9 is a route guidance diagram of a graphical user interface of a wearable device according to an embodiment of the present disclosure.

Referring to FIGS. 2 to 4, in an implementation, the route data of the competition route may include multiple route points. The multiple route points include a normal route point, a start point position, an end point position and a check-in point. In an implementation, a GPS recording device may be used for collecting longitude and latitude data of the route points, and altitude data of the route points along the competition track to form the competition route. For example, 100 route points may be provided on a competition track having a length of 3 km to form the competition route. After the competition route is obtained, the GPS recording device may be used for noting a part of the route points as check-in points while collecting the route points. A notation of a check-in point position includes longitude and latitude information, altitude information, a name, an accumulative climbing altitude, a distance from the start point and the like of the check-in point. Computer-side map-making software, such as Google Earth, may also be used for copying along the competition track to form the competition route. After the competition route is obtained, the computer-side map-making software may also be used for noting the check-in point positions on the route. The notation of the check-in point position includes the longitude and latitude information, the altitude information, the name, the accumulative climbing altitude, the distance from the start point and the like of the check-in point. After the above operations are completed, a file may be exported from the GPS recording device or a route file is saved in a specified format (such as a gpx format) by using the computer-side map-making software, and transmitted to the wearable device including a GPS navigation or the like.

In an implementation, the normal route point may include the longitude, the latitude and the altitude. The check-in point may include the name, the altitude, the accumulative climbing altitude, the longitude, the latitude and the distance from the start point of the check-in point. The accumulative climbing altitude of the check-in point may refer to an accumulative climbing altitude from the start point to the check-in point. In other implementations, the accumulative climbing altitude of the check-in point may also refer to an accumulative climbing altitude from a previous check-in point to the check-in point.

In an implementation, the user may import the route data of the competition route into the wearable device, and the wearable device may be used for parsing the route data of the competition route. For example, the wearable device may extract information such as the name, the longitude, the latitude and the altitude of the check-in point, and calculate a distance from the check-in point to the start point and the accumulative climbing altitude according to information such as the longitude, the latitude and the altitude of the route point before the check-in point.

Referring to FIGS. 3 to 9, before the competition, the athlete user can view the route in the wearable device including the GPS navigation, know the difficulty and the check-in point position of each competition segment during the competition, and also know a total horizontal distance, a total ascend distance, a total descend distance, an altitude, segment information and check-in point information of the competition track, which includes positions and altitudes of the start point, the end point and the check-in points, an accumulative climbing altitude from the start point to each check-in point, a name of each check-in point, a distance from the start point to each check-in point, an altitude of each check-in point position and so on until to the end point position. The athlete user can also know information such as the highest altitude and the lowest altitude, which is convenient to prepare for the competition.

In an implementation, the route data of the competition route includes longitude data, latitude data and/or altitude data, and then a feature position notation is performed on the competition route. The feature position notation includes at least longitude information, latitude information and feature position name information. The feature position in the embodiment of the present disclosure includes multiple check-in points, and the feature position notation includes longitude information, latitude information and name information corresponding to each check-in point. In the embodiment of the present disclosure, the feature position data and the position data of the wearable device each include at least one of corresponding longitude data, latitude data or altitude data, or other position information; and correspondingly, the relative position data includes at least one of relative longitude data, relative latitude data or relative altitude data. The feature position includes the start point position, the end point position and the check-in point. Therefore, in the embodiment of the present disclosure, after current position data of the wearable device is detected and the feature position for which the relative position data need to be calculated is determined, the relative position data is calculated on the wearable device according to the current position data and the feature position data of the device so as to provide information related to the relative position on the wearable device. Thus, the athlete can determine a position of the current position on the competition route according to the information related to the relative position, and further the athlete can focus more on the competition course, thereby assisting to solve problems that the athlete runs in the wrong way and the check-in points cannot be inaccurately guided.

Figure 10:
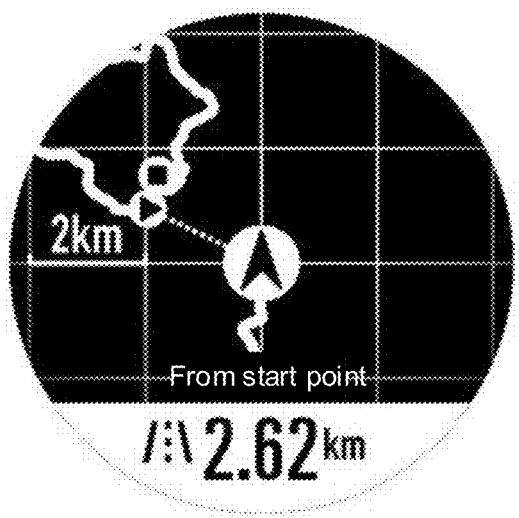
FIG. 10 is a start point guiding diagram of a graphical user interface of a wearable device according to an embodiment of the present disclosure.

Referring to FIG. 10, when the feature position is the start position, the step in which the relative position data is calculated on the wearable device according to the current position data and the feature position data of the device may include the following steps: a straight line is drawn between a current position of the athlete, i.e., the current position data of the wearable device, and the start point position of the competition route, and a straight line distance between these two points is calculated, so that the athlete can determine a relative distance between the athlete and the start point position before and during the competition as needed, which is convenient for the athlete to find the start point position or know the competition course that has been carried out as soon as possible.

When the feature position is the check-in point, the embodiment of the present disclosure can implement assisting the athlete to find the check-in point position at each stage of the competition, facilitate time planning and physical strength distribution, and can be used in various GPS navigation devices.

In an implementation, the step in which the corresponding prompt information is output on the wearable device includes the following step: corresponding prompt voice information is output on the wearable device and/or corresponding prompt graphic and text information is displayed on a display screen of the wearable device. Of course, the corresponding prompt voice information may be output in combination with a manner of a vibration buzzer prompt on the wearable device. In an implementation, the whole-course competition track interface can be zoomed in/out by using buttons and displayed on the display screen of the wearable device, and microscopic and macroscopic conditions of the route may be viewed by switching different scales. A heading viewing angle may also be adjusted, for example, the route may be matched and rotated toward a 12 o'clock position of the GPS navigation device according to a heading direction of the athlete. When the route is indicated, the route may be prompted and guided by a voice or graphically guided by a display arrow to guide the user in a correct heading direction.

Figure 11:
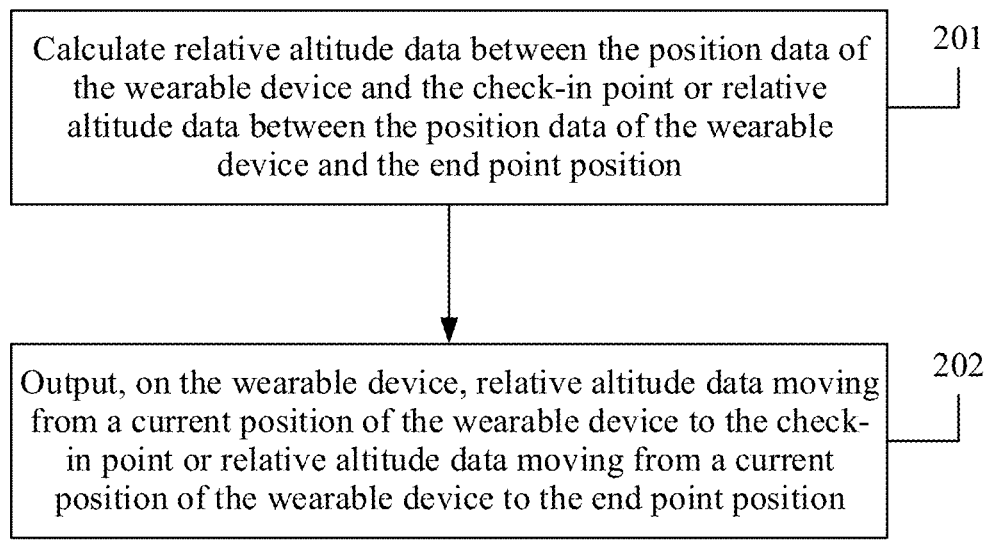
FIG. 11 is another flowchart of a control method of a wearable device according to an embodiment of the present disclosure.

Referring to FIG. 11, in an implementation, when the feature position is the check-in point or the end point position, the method includes the steps described below.

In step 201, relative altitude data between the position data of the wearable device and the check-in point or relative altitude data between the position data of the wearable device and the end point position is calculated.

In step 202, relative altitude data moving from a current position of the wearable device to the check-in point or relative altitude data moving from a current position of the wearable device to the end point position is output on the wearable device.

In the embodiment of the present disclosure, the relative altitude data includes a relative altitude difference value and remaining climb data. Data information of the feature position includes feature position altitude data, the position data of the wearable device also includes altitude data of the wearable device, and the competition route includes the longitude and latitude data, and the altitude data of the multiple route points. Therefore, when the user needs to know the competition process at the distance and the altitude, a relative altitude difference value between the position data of the wearable device and the check-in point or a relative altitude difference value between the position data of the wearable device and the end point position may be calculated according to the preceding information, all remaining climb data required for moving from the position data of the wearable device to the check-in point or from the position data of the wearable device to the end point position may be calculated, and the calculated data is output through the wearable device, so that the athlete can plan the time and distribute the physical strength to formulate the competition strategy.

Figure 12:
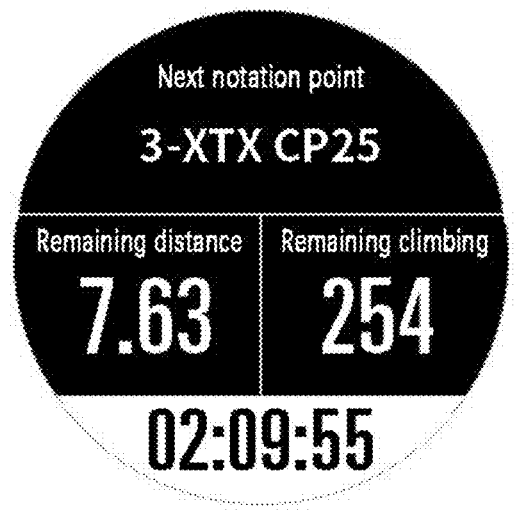
FIG. 12 is a schematic diagram of a remaining distance and a remaining climbing of a graphical user interface of a wearable device according to an embodiment of the present disclosure.

Referring to FIG. 12, in an implementation, the relative altitude data includes remaining climb data, and the step in which the relative altitude data between the position data of the wearable device and the check-in point or the relative altitude data between the position data of the wearable device and the end point position includes the following step: route points between the position data of the wearable device and a next check-in point are determined to be a first route point set, or route points between the position data of the wearable device and the end point position are determined to be a second route point set. The remaining climb data is calculated according to the first route point set or the second route point set. Further, the step in which the remaining climb data is calculated according to the first route point set or the second route point set includes the following step: altitude ascent values between all adjacent route points whose altitude ascend in the first route point set or altitude ascent values between all adjacent route points whose altitude ascend in the second route point set are superimposed successively to obtain the remaining climb data. That is, altitude differences between the route points which have not been passed and have a positive altitude ascent part from a current altitude of the wearable device to the next check-in point or from a current altitude of the wearable device to the end point position on the competition route are added as the remaining climb data.

In another implementation, the step in which the relative altitude data between the position data of the wearable device and the check-in point includes the following steps: route points between the position data of the wearable device and the start point are determined to be the first route point set; and the remaining climb data is calculated according to the first route point set. Further, the step in which the remaining climb data is calculated according to the first route point set includes the following step: the altitude ascent values between all adjacent route points whose altitude ascend in the first route point set are superimposed successively to obtain the remaining climb data. The remaining climb data may be calculated by subtracting a climbed altitude from an accumulative climbing altitude of the next check-in point.

In another implementation, the relative altitude data further includes remaining downslope data, and correspondingly, the step in which the relative altitude data between the position data of the wearable device and the check-in point or the relative altitude data between the position data of the wearable device and the end point position includes the following steps: route points between the position data of the wearable device and the next check-in point are determined to be a first downslope route point set, or route points between the position data of the wearable device and the end point position are determined to be a second downslope route point set. The remaining climb data is calculated according to the first downslope route point set or the second downslope route point set. Further, the step in which the remaining climb data is calculated according to the first downslope route point set or the second downslope route point set includes the following step: altitude descent values between all adjacent route points whose altitude descend in the first downslope route point set or altitude descent values between all adjacent route points whose altitude descend in the second downslope route point set are superimposed successively to obtain the remaining downslope data. That is, altitude differences between the route points which have not been passed and have a positive altitude descend part from a current altitude of the wearable device to the next check-in point or from a current altitude of the wearable device to the end point position on the competition route are added as the remaining downslope data.

Figure 13:
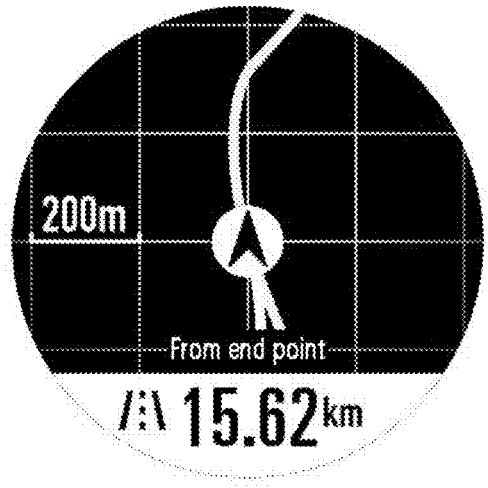
FIG. 13 is an end point guiding diagram of a graphical user interface of a wearable device according to an embodiment of the present disclosure.
Figure 14:
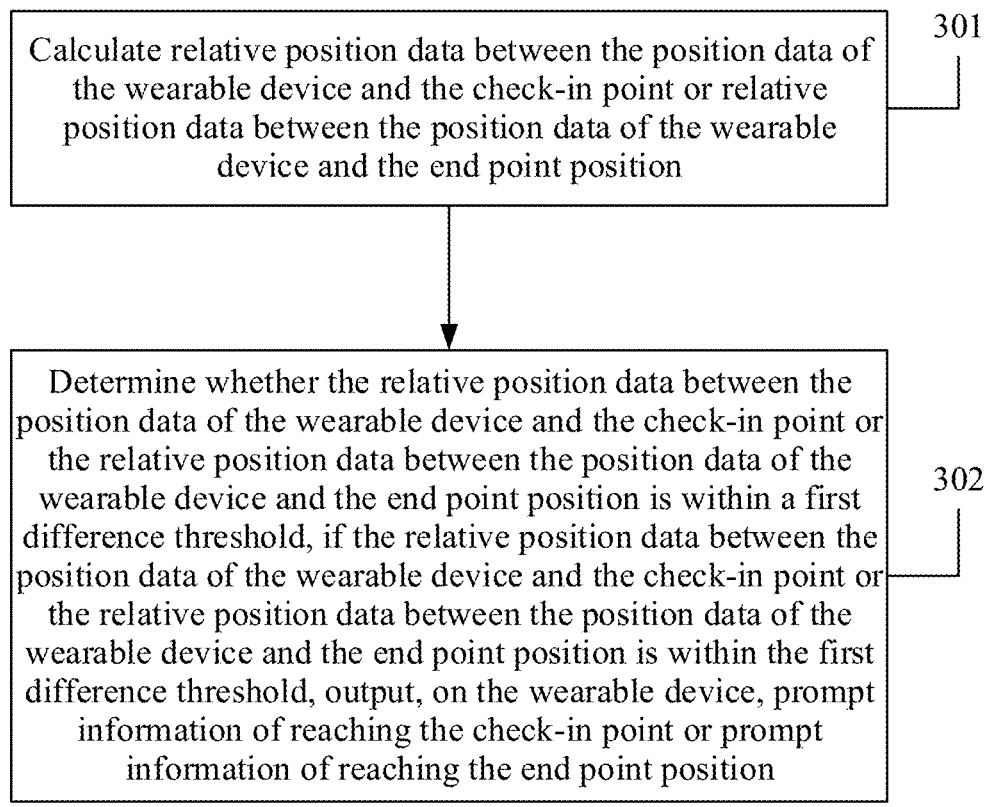
FIG. 14 is another flowchart of a control method of a wearable device according to an embodiment of the present disclosure.

Similarly, remaining distance data between the position data of the wearable device and the check-in point or remaining distance data between the position data of the wearable device and the end-point position may also be calculated. Referring to FIG. 13, that is, distances between longitude and latitude data of adjacent route points which have not been passed from a current position of the wearable device to the next check-in point on the competition route are added to obtain the remaining distance data. Distances between the route points from the current position to the start point may also be superimposed to obtain a completed distance, and a remaining distance may be calculated by subtracting the completed distance from a distance from the next check-in point to the start point. In the embodiment of the present disclosure, the remaining climb data, the remaining downslope data and the remaining distance data may be displayed on the display screen at the same time to facilitate the athlete knowing the competition route situation, thereby planning the time and distributing the physical strength to formulate the competition strategy Referring to FIG. 14, in an implementation, when the feature position is the check-in point or the end point position, the method includes the step described below.

In step 301, relative position data between the position data of the wearable device and the check-in point or relative position data between the position data of the wearable device and the end point position is calculated.

The step in which the corresponding prompt information is output on the wearable device according to the relative position data includes the step described below.

In step 302, whether the relative position data between the position data of the wearable device and the check-in point or the end point position is within a first difference threshold is determined, and if the relative position data between the position data of the wearable device and the check-in point or the end point position is within the first difference threshold, prompt information of reaching the check-in point or the end point position is output on the wearable device.

Figure 15:
FIG. 15 is a check-in prompt diagram of a graphical user interface of a wearable device according to an embodiment of the present disclosure.

In the embodiment of the present disclosure, the feature position may be selected by the user as a closest check-in point among the multiple check-in points, the end point position or other check-in points on the wearable device according to the current position of the wearable device. Of course, closest or other feature position data may also be determined according to the position data of the wearable device and the route data of the competition route. After the feature position is determined to be the check-in point or the end point position, a relative position between a current position data of the wearable device and the check-in point or a relative position between a current position data of the wearable device and the end point position is calculated, and whether the relative position data satisfies the first difference threshold is determined. The first difference threshold in the embodiment of the present disclosure may be preset as an appropriate horizontal distance threshold and/or altitude distance threshold which is less than 10 m, so that when the athlete reaches somewhere in the vicinity of the check-in point or the end point position in navigation, that is, the first difference threshold is satisfied, and prompt information of reaching the check-in point or the end point position is output on the wearable device. Referring to FIG. 15, the specific prompt manner may be that outputting the corresponding prompt information on the wearable device includes outputting corresponding prompt voice information on the wearable device and/or displaying corresponding prompt graphic and text information on a display screen of the wearable device. Of course, outputting the corresponding prompt information may also be executed in combination with a manner of a vibration buzzer prompt on the wearable device to remind the athlete that the athlete has entered the competition route or that the athlete needs to check in at this position to avoid missing.

In an implementation, the step in which the feature position located in the competition route and the corresponding feature position data are determined based on the position data of the wearable device and the route data of the competition route includes the steps described below.

After searching on the competition route, a route point having a closest distance from a position of a projection of the wearable device is determined to be a third route point, where the third route point is searched on the competition route according to at least one of the longitude data or the latitude data of the wearable device; or after searching on the competition route, a route point having a closest spatial distance from a position of a projection of the wearable device is determined to be a fourth route point, where the fourth route point is searched on the competition route according to at least one of the longitude data, the latitude data or the altitude data of the wearable device.

The feature position located in the competition route is determined according to the third route point or the fourth route point to obtain the feature position data.

In the embodiment of the present disclosure, the feature position data located in the competition route is determined based on the position data of the wearable device and the route data of the competition route is mainly calculated in the following manner: a match degree of a current longitude and latitude data and/or altitude data of the wearable device with the longitude and latitude, and the altitude of the competition route is calculated, thereby determining the route point having a closest distance from the wearable device on the competition route, i.e., the third route point or the fourth route point, thereby further determining feature position data closest to the current position of the wearable device according to the third route point or the fourth route point. The third route point or the fourth route point may be calculated by calculating a third route point having the closest horizontal distance or a fourth route point having the closest spatial distance. Further, the third route point may be calculated by selecting two longitude and latitude route points closest to the position of the wearable device on the competition route, making a perpendicular line between the current position of the wearable device and a connection line of the two longitude and latitude route points, and taking an intersection point between the perpendicular line and the competition route as the third route point. Similarly, the fourth route point and a relative distance between the fourth route point and the wearable device may be positioned in conjunction with the altitude data and a spatial relative distance is calculated.

In an implementation, before the step in which the feature position located in the competition route according to the third route point or the fourth route point is determined to obtain the feature position data, the method further includes the step described below.

Whether relative position data between the position data of the wearable device and the third route point or the fourth route point exceeds a second difference threshold is determined, and if the relative position data between the position data of the wearable device and the third route point or the fourth route point exceeds the second difference threshold, prompt information of route deviation is output on the wearable device.

Figure 16:
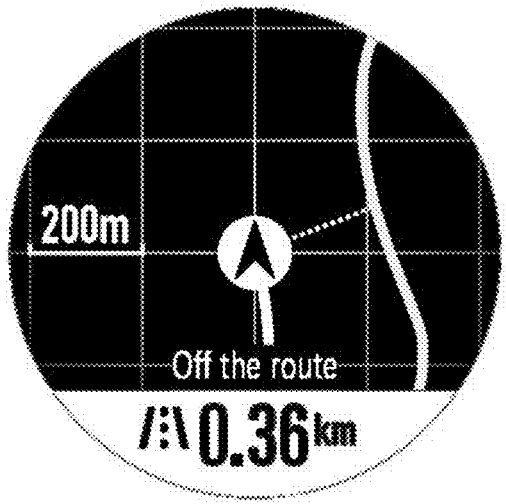
FIG. 16 is a deviation prompt diagram of a graphical user interface of a wearable device according to an embodiment of the present disclosure.

Referring to FIG. 16, in the embodiment of the present disclosure, to help the athlete not deviate from the route in navigation, a preset value of the second difference threshold is determine in advance, which may be an appropriate deviation distance such as exceeding 20 m, so that when it is detected that the position data of the wearable device deviates from the competition route exceeding 20 m, that is, exceeding the second difference threshold, prompt information of having deviated from the route is output on the wearable device, so as to help remind the athlete of keeping moving in the route specified by the competition committee, avoid running in the wrong way to a dangerous environment such as a cliff and a beast infested area, and ensure the personal safety of the athlete in the competition. In the embodiment of the present disclosure, the deviation distance of the user with respect to the competition route is determined by determining the relative position difference between the position data of the wearable device and the third route point or the relative position difference between the position data of the wearable device and the fourth route point. Of course, those skilled in the art should understand that the relative position difference between the wearable device and the competition route may also be determined by using other commonly-used calculation methods, which is not expanded in the embodiment of the present disclosure.

Figure 17:
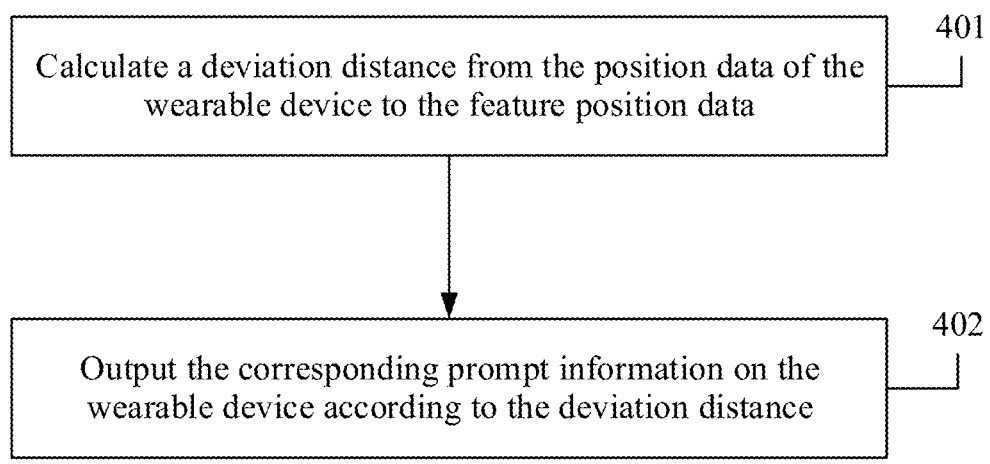
FIG. 17 is another flowchart of a control method of a wearable device according to an embodiment of the present disclosure.

Referring to FIG. 17, in another implementation, the method further includes the steps described below.

In step 401, a deviation distance from the position data of the wearable device to the feature position data is calculated.

In step 402, the corresponding prompt information is output on the wearable device according to the deviation distance.

In the embodiment of the present disclosure, when the relative position difference between the position data of the wearable device and the third route point or the relative position difference between the position data of the wearable device and the fourth route point exceeds the second difference threshold, that is, the athlete user deviates from the competition route and exceeds a set allowable distance, so it is necessary to re-navigate the athlete user back to the competition route. The deviation distance from the position data of the wearable device to the feature position data may be calculated and the prompt information corresponding to the deviation distance is output on the wearable device, so as to re-navigate the user back to the competition route and assist the user to finish the competition quickly.

In an implementation, one or more third route points or fourth route points closest to the position data of the wearable device may be determined by the position data of the wearable device, and a straight line is obtained by one or more third route points or fourth route points. In an implementation, in a case where the third route points or fourth route points are two route points, a straight line a passing through the two route points is obtained; and in a case where the third route points or fourth route points are three route points or more than three route points, a most suitable straight line b is obtained by fitting. A distance of a perpendicular line segment between the position data of the wearable device and the straight line a or a distance of a perpendicular line segment between the position data of the wearable device and the straight line b is acquired as route guidance information.

Of course, those skilled in the art should understand that route guidance information of moving from the current position of the wearable device to an adjacent point position may also be output directly on the wearable device to guide the athlete user to the competition route as soon as possible.

In another aspect, an embodiment of the present disclosure provides a control apparatus of a wearable device. The apparatus includes a route providing module, a position acquisition module, a feature determination module, a relative position calculation module and a prompt module.

The route providing module is configured to provide route data of a competition route. The route data of the competition route includes check-in point data.

The position acquisition module is configured to acquire position data of the wearable device.

The feature determination module is configured to determine, based on the position data of the wearable device and the route data of the competition route, a feature position located in the competition route and corresponding feature position data.

The relative position calculation module is configured to calculate relative position data between the position data of the wearable device and the feature position data.

The prompt module is configured to output corresponding prompt information on the wearable device according to the relative position data.

In another aspect, an embodiment of the present disclosure provides a wearable device, including a processor, which is configured to provide route data of a competition route, where the route data of the competition route includes check-in point data; acquire position data of the wearable device; determine, based on the position data of the wearable device and the route data of the competition route, a feature position located in the competition route and corresponding feature position data; calculate relative position data between the position data of the wearable device and the feature position data; and output corresponding prompt information on the wearable device according to the relative position data.

In an aspect, an embodiment of the present disclosure provides a non-transitory computer-readable storage medium configured to store computer programs, where the computer programs, when executed by a processor, implement the steps in any method described above.

In the present disclosure, relevant modules or processors, units and specific contents executed by computer programs in the computer readable storage medium, the wearable device and the control apparatus of the wearable device correspond to the preceding embodiments of the present disclosure. Reference may be made to the preceding embodiments of the present disclosure for detailed understanding. Details are not described herein.

In the embodiments of the present disclosure, an implementation sequence of multiple steps may be replaced without affecting the implementation purpose, and contents of the multiple embodiments may be combined with each other.

Finally, it is to be noted that the above are merely preferred embodiments of the embodiments of the present disclosure and not intended to limit the embodiments of the present disclosure. Although the present disclosure is described in detail with reference to the preceding embodiments, those skilled in the art can still modify the technical solutions described in the preceding embodiments, or make equivalent substitutions on part of the technical features therein. Any modifications, equivalent substitutions, improvements and the like made within the spirit and principle of the present disclosure are within the scope of the present disclosure.

What is claimed is:

1. A control method of a wearable device, comprising:
providing route data of a competition route, wherein the route data of the competition route comprises check-in point data; wherein the route data of the competition route comprises a plurality of route points, and the plurality of route points comprises a start point position, an end point position and a check-in point;
acquiring position data of the wearable device;
determining, based on the position data of the wearable device and the route data of the competition route, a feature position located in the competition route and corresponding feature position data;
calculating relative position data between the position data of the wearable device and the feature position data; and
outputting corresponding prompt information on the wearable device according to the relative position data;
wherein determining, based on the position data of the wearable device and the route data of the competition route, the feature position located in the competition route and the corresponding feature position data comprises:

after searching on the competition route, determining a route point having a closest distance from a position of a projection of the wearable device to be a third route point, wherein the third route point is searched on the competition route according to at least one of longitude data or latitude data of the wearable device; or after searching on the competition route, determining a route point having a closest spatial distance from a position of the wearable device to be a fourth route point, wherein the fourth route point is searched on the competition route according to at least one of longitude data, latitude data or altitude data of the wearable device; and determining the feature position located in the competition route according to the third route point or the fourth route point to obtain the feature position data.

2. The control method of claim 1, wherein the feature position data and the position data of the wearable device each comprise at least one of corresponding longitude data, latitude data or altitude data; and, correspondingly, the relative position data comprises at least one of relative longitude data, relative latitude data or relative altitude data.

3. The control method of claim 2, wherein the feature position comprises at least one of the start point position, the end point position or the check-in point.

4. The control method of claim 3, wherein in response to determining that the feature position is the check-in point or the end point position, the method comprises:

calculating relative altitude data between the position data of the wearable device and the check-in point or relative altitude data between the position data of the wearable device and the end point position; and outputting, on the wearable device, relative altitude data moving from a current position of the wearable device to the check-in point or relative altitude data moving from a current position of the wearable device to the end point position.

5. The control method of claim 4, wherein the relative altitude data comprises remaining climb data, and calculating the relative altitude data between the position data of the wearable device and the check-in point or the relative altitude data between the position data of the wearable device and the end point position comprises:

determining route points between the position data of the wearable device and a next check-in point to be a first route point set, or determining route points between the position data of the wearable device and the end point position to be a second route point set; and calculating the remaining climb data according to the first route point set or the second route point set.

6. The control method of claim 5, wherein calculating the remaining climb data according to the first route point set or the second route point set comprises:

superimposing altitude ascent values between all adjacent route points whose altitude ascend in the first route point set or altitude ascent values between all adjacent route points whose altitude ascend in the second route point set successively to obtain the remaining climb data.

7. The control method of claim 3, wherein in response to determining that the feature position is the check-in point or the end point position, the method comprises:

calculating relative position data between the position data of the wearable device and the check-in point or relative position data between the position data of the wearable device and the end point position; and wherein outputting the corresponding prompt information on the wearable device according to the relative position data comprises:

determining whether the relative position data between the position data of the wearable device and the check-in point or the relative position data between the position data of the wearable device and the end point position is within a first difference threshold, in response to determining that the relative position data between the position data of the wearable device and the check-in point or the relative position data between the position data of the wearable device and the end point position is within the first difference threshold, outputting, on the wearable device, prompt information of reaching the check-in point or prompt information of reaching the end point position.

8. The control method of claim 1, wherein before determining the feature position located in the competition route according to the third route point or the fourth route point to obtain the feature position data, the method further comprises:

determining whether a relative position difference between the position data of the wearable device and the third route point or a relative position difference between the position data of the wearable device and the fourth route point exceeds a second difference threshold, in response to determining that the relative position difference between the position data of the wearable device and the third route point or the relative position difference between the position data of the wearable device and the fourth route point exceeds the second difference threshold, outputting, on the wearable device, prompt information of route deviation.

9. The control method of claim 1, wherein determining the feature position located in the competition route according to the third route point or the fourth route point to obtain the feature position data further comprises:

calculating a deviation distance from the position data of the wearable device to the feature position data; and outputting the corresponding prompt information on the wearable device according to the deviation distance.

10. The control method of claim 1, wherein outputting the corresponding prompt information on the wearable device comprises:

outputting corresponding prompt voice information on the wearable device and/or displaying corresponding prompt graphic and text information on a display screen of the wearable device.

11. The control method of claim 1, wherein the route data comprises at least one of longitude data, latitude data or altitude data, and the method further comprises:

performing a feature position notation on the competition route, wherein the feature position notation comprises at least longitude information, latitude information and feature position name information.

12. A wearable device, comprising: a processor, which is configured to: provide route data of a competition route, wherein the route data of the competition route comprises check-in point data, wherein the route data of the competition route comprises a plurality of route points, and the plurality of route points comprises a start point position, an end point position and a check-in point; acquire position data of the wearable device; determine, based on the position data of the wearable device and the route data of the competition route, a feature position located in the competition route and corresponding feature position data; calculate relative position data between the position data of the wearable device and the feature position data; and output corresponding prompt information on the wearable device according to the relative position data;

wherein the processor is further configured to:
after searching on the competition route, determine a route point having a closest distance from a position of a projection of the wearable device to be a third route point, wherein the third route point is searched on the competition route according to at least one of longitude data or latitude data of the wearable device; or after searching on the competition route, determine a route point having a closest spatial distance from a position of the wearable device to be a fourth route point, wherein the fourth route point is searched on the competition route according to at least one of longitude data, latitude data or altitude data of the wearable device; and determine the feature position located in the competition route according to the third route point or the fourth route point to obtain the feature position data.

13. The wearable device of claim 12, wherein the feature position data and the position data of the wearable device each comprise at least one of corresponding longitude data, latitude data or altitude data; and, correspondingly, the relative position data comprises at least one of relative longitude data, relative latitude data or relative altitude data.

14. The wearable device of claim 13, wherein the feature position comprises at least one of the start point position, the end point position or the check-in point.

15. A non-transitory computer-readable storage medium having a computer program stored thereon, wherein the computer program, when executed by a processor, implements:

providing route data of a competition route, wherein the route data of the competition route comprises check-in point data; wherein the route data of the competition route comprises a plurality of route points, and the plurality of route points comprises a start point position, an end point position and a check-in point;

acquiring position data of the wearable device;

determining, based on the position data of the wearable device and the route data of the competition route, a feature position located in the competition route and corresponding feature position data;

calculating relative position data between the position data of the wearable device and the feature position data; and outputting corresponding prompt information on the wearable device according to the relative position data;

wherein determining, based on the position data of the wearable device and the route data of the competition route, the feature position located in the competition route and the corresponding feature position data comprises:

after searching on the competition route, determining a route point having a closest distance from a position of a projection of the wearable device to be a third route point, wherein the third route point is searched on the competition route according to at least one of longitude data or latitude data of the wearable device; or after searching on the competition route, determining a route point having a closest spatial distance from a position of the wearable device to be a fourth route point, wherein the fourth route point is searched on the competition route according to at least one of longitude data, latitude data or altitude data of the wearable device; and determining the feature position located in the competition route according to the third route point or the fourth route point to obtain the feature position data.

16. The non-transitory computer-readable storage medium of claim 15, wherein the feature position data and the position data of the wearable device each comprise at least one of corresponding longitude data, latitude data or altitude data; and, correspondingly, the relative position data comprises at least one of relative longitude data, relative latitude data or relative altitude data.

17. The non-transitory computer-readable storage medium of claim 16, wherein the feature position comprises at least one of the start point position, the end point position or the check-in point.

18. The wearable device of claim 12, wherein the processor is further configured to:
determine whether a relative position difference between the position data of the wearable device and the third route point or a relative position difference between the position data of the wearable device and the fourth route point exceeds a second difference threshold,
in response to determining that the relative position difference between the position data of the wearable device and the third route point or the relative position difference between the position data of the wearable device and the fourth route point exceeds the second difference threshold, output, on the wearable device, prompt information of route deviation.

19. The wearable device of claim 12, wherein the processor is further configured to:
calculate a deviation distance from the position data of the wearable device to the feature position data; and
output the corresponding prompt information on the wearable device according to the deviation distance.

20. The non-transitory computer-readable storage medium of claim 15, wherein before determining the feature position located in the competition route according to the third route point or the fourth route point to obtain the feature position data, the computer program, when executed by a processor, further implements:
determining whether a relative position difference between the position data of the wearable device and the third route point or a relative position difference between the position data of the wearable device and the fourth route point exceeds a second difference threshold, in response to determining that the relative position difference between the position data of the wearable device and the third route point or the relative position difference between the position data of the wearable device and the fourth route point exceeds the second difference threshold, outputting, on the wearable device, prompt information of route deviation.

* * * * *